2,975,126
PROCESS FOR FORMING A CHEMICAL PRODUCT FROM BARK

Lloyd E. Van Blaricom, Shelton, Wash., and George M. Tokos, Hayward, Calif., assignors to Rayonier Incorporated, Shelton, Wash., a corporation of Delaware No Drawing. Filed Feb. 11, 1958, Ser. No. 714,479

12 Claims. (Cl. 252—8.5)

This invention relates to the digestion of hemlock bark to derive chemicals therefrom, and has for its object the provision of an improved process of reacting the bark derivative with an aldehyde, and an improved chemical product resulting from the reaction. The process of the invention comprises digesting western hemlock bark (*Tsuga heterophylla*) with an aqueous solution of a sulfurous acid salt of an alkali metal, such as sodium or potassium, or ammonium, at a suitably elevated temperature, to form a water-soluble derivative containing salts of hydroxy aromatic polymeric compounds, and the reaction of the bark derivative with an aldehyde. The product resulting from the reaction of the bark derivative with an aldheyde in the process of the invention has improved properties making it especially effective for use as a drilling mud additive.

It has been found that the bark derivatives obtained by digesting hemlock bark with solutions of sulfurous acid salts of sodium, potassium or ammonium, either acid or alkaline, including the bisulfite or sulfite salts or mixtures thereof, and whether or not the bark has been extracted with an organic solvent to remove saponifiable fats and waxes, are not always entirely satisfactory for use in alkaline drilling muds as viscosity control or dispersing agents because they may cause air-cutting and/or foaming when the mud is agitated. This invention is based on the discovery that the bark derivative from the digestion can be reacted with relatively small quantities of an aldehyde to form an improved product which does not cause the objectionable air-cutting or foaming in alkaline drilling muds when they are agitated.

Without attempting to predicate the invention on any theory as to what takes place in the process it appears that low-molecular weight phenolic materials in the bark derivative cause objectionable air-cutting and/or foaming in many cases, and that the aldehyde condenses, or otherwise reacts, with these phenolic materials, changing them into larger molecules and thereby eliminating their natural surface active properties.

Although various products obtained by digesting hemlock bark in an aqueous solution of an alkali metal or ammonium salt of sulfurous acid at an elevated temperature can be benefited by reaction with an aldehyde, it is particularly advantageous to produce the products according to the following preferred operations.

In carrying out digestion operations to obtain bark derivatives for use in the invention, western hemlock bark which is usually obtained in large pieces is preferably reduced in size to pass screens of about 1 to about 20 meshes to the inch in order to avoid an excessive amount of void space in the charge and to aid penetration of the reacting solution. This may be accomplished by conventional means, as by a hammer mill or attrition mill. As an operating expedient, it is also desirable to avoid excessive amounts of fines, such as bark dust, which sometimes clog filters, although such fines are in condition for rapid digestion. It has been found that digestion temperatures ranging from about 105° C. to about 200° C. can be used. In using the lower temperatures, longer digestion periods are desirable but temperatures as high as 200° C. can be used for digestions of considerable length, say, for example, an hour, without consuming all of the sulfurous acid salts or materially decomposing the organic products. For digestions which are both rapid and relatively efficient, temperatures of about 150° C. to about 170° C. are preferred. Digestion periods of about fifteen minutes to about 4 hours are used, but at all events the digestions are stopped while there still remains some content of sulfurous acid salt in the charge. Two hours is ordinarily the practical time limit at the higher temperatures. A smaller proportion of the alkali sulfurous acid salt than that equivalent to about 0.03 part of sulfur dioxide per part of oven-dry bark is insufficient, but more salt than that equivalent to about 0.20 part sulfur dioxide per part of oven-dry bark is more than is needed to carry out the reaction satisfactorily. A slight excess of chemicals acts to protect the extractants at the high temperatures, and this action may be lost at concentrations below 0.03%. However, an excess over 0.20% can be used, provided the inorganic salts resulting from such excessive amounts are not deemed deleterious in the solutions of the product.

In using the subdivided bark of the sizes indicated, about 10% to about 20% of the bark on the basis of its equivalent oven-dry weight is desirable in the charge, the rest of the charge being water and the sulfurous acid salts. However, the amount of water is not critical. The amounts of water indicated are preferable since such amounts provide water to act as solvent for the inorganic material and for the aromatic sulfonates formed, as well as to provide the presence of water and sulfurous acid radical in the reaction mass. Amounts of water in excess of the proportions indicated may be present, but water in excess of such proportions tends to slow the reaction by dilution of the chemical, serves in general to require excessive space in the digesters, and eventually gives a very dilute product solution requiring a correspondingly costly evaporation to produce the solids in the form of concentrated solutions or in dry form. In general it is desirable but not necessary to agitate the charge in the digester, although continuous mixing reduces somewhat the required time of reaction. The digestion equipment and physical condition of the bark must be capable of bringing the bark material and water solution of alkali sulfurous acid salt into intimate contact. Either batch or continuous operations may be carried out in a single stage or in a multiplicity of stages.

Following the digestion, the products of the reaction as well as any other water-soluble material are separated from the insoluble bark residue. Some of the products of reaction are contained in solution occluded in the bark residue, and in view of their relatively high molecular weight and slow diffusion rates, the separation of this material by washing operations dependent on diffusion has disadvantages, however, still representing considerable improvement over older procedures of lixiviating undigested bark. Such separation of occluded reaction materials simply by washing involves uneconomic dilution, and is not even relatively complete unless many changes of water and prolonged soaking periods for diffusion are provided.

Effective and rapid separation of soluble products of digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press, is especially effective, in that solutions of maximum concentration are producible. Using batch pressing, it will frequently be found desirable to reslurry the pressed residue in water and repress.

The solutions usually contain a small amount of insoluble material such as bark in fine subdivision which, if desired, may be separated by filtration. The products may be used in the form of water solutions of suitable concentrations or in the form of solids. Concentration of the solutions may be effected by known methods of evaporation, and the like, either at atmospheric or reduced pressure, but temperatures not exceeding those used in the digestion of the bark are preferable in order to avoid degradation of the phenolic material present. Solid products may be produced by known methods, such as spray drying and drum drying, conducted at atmospheric or reduced pressures, preferably avoiding excessive temperatures and oxidizing conditions which would affect the tannins where further reactions are not desired.

The bark of hemlock trees is composed of various materials which are significant to the invention, including a large proportion of insoluble hydroxy aromatic compounds, varying small proportions of various water-soluble tannins, and some saponifiable fats and waxes. With the exception of the fats and waxes, a considerable proportion of the insoluble part of the bark is converted by the present process of digestion into water-soluble alkali sulfonate salts of hydroxy aromatic compounds. Besides these organic salts, the water-soluble solids in the reaction product comprise alkali sulfurous and sulfuric acid salts derived from the charged inorganic salts. A small but varying proportion of such salts are sulfurous acid salts. The ratio of organic to unreacted inorganic material present in the solid product varies and depends upon a number of factors among which are the amount of convertible material in the bark, the amount of the insoluble proportion of the bark material converted and the proportion of bark to inorganic sulfurous acid salt used in the charge. The organic material contains aromatic compounds and will have relatively large proportions of phenolic hydroxy groups.

The process of digestion may be carried out as described and claimed in the copending application of L. E. Van Blaricom and K. R. Gray, Serial No. 304,004, filed August 12, 1952, now U.S. Patent No. 2,831,022. However, a preferred variation of said process is described and claimed in said applicants' application Serial No. 688,388, filed October 7, 1957. This latter application pertains to the digestion of the bark in acid solutions of said salts at a pH below 7.0 and in solutions containing mixtures of bisulfites and sulfites of said alkali metals under similar operating conditions. We prefer to use a water solution containing from 50% to 75% of the active chemical as sodium bisulfite, and the balance sodium sulfite. In the digestions at a pH below 7.0 and with the mixed bisulfite-sulfite, the saponifiable fats and waxes are practically unaffected, and the resultant smallness of the amount of such fats and waxes in the derivative gives the product of reaction with an aldehyde additional benefits which seem to be cumulative.

In forming the improved product of the invention, a solution of the bark derivative in water, preferably at a pH of about 8.0 to 8.5, is simply mixed with a suitable aldehyde and the mixture heated to an elevated temperature in order to cause the bark derivative and aldehyde to condense. A low pH, particularly at the concentrations normally used in the process of this invention, has a tendency to cause gelling of the solution during the condensation. Therefore, if the aqueous solution of bark derivatives, as originally recovered, has a low pH, it is generally preferable to react it with sufficient alkali to raise said pH to about 8.0 to 8.5. Premature gelling of the solution can also be avoided by dilution of the reactants with water but this, of course, makes it necessary to remove more water when the product is concentrated or spray-dried.

Suitable aldehydes or aldehydic materials for use in this invention have been found to include formaldehyde, acetaldehyde, glyoxal, furfural and hexamethylenetetramine. Of these formaldehyde is the preferred compound for reasons of economy and convenience.

Amounts of aldehyde ranging from 2% formaldehyde to 10% furfural and 6% formaldehyde may be used, the optimum benefit being obtained by the use of from 3% to 5% of formaldehyde or other aldehyde equivalent thereto. Below 3%, the effectiveness of the product falls off quite rapidly and above that amount it starts to affect the 10 minute gel strength of the drilling mud adversely in many cases. If this effect is not too severe, however, amounts of aldehyde up to about 6% can be used. The operating range is accordingly from about 2 to 6% of formaldehyde, or its equivalent, based on the weight of the bone-dry bark derivative.

A wide range of reaction conditions are operative when reacting the aldehyde with the bark derivative, as long as a condensation reaction takes place. No appreciable benefit is obtained by simply mixing the reagents without reaction. The aldehyde and bark derivative may be heated together in aqueous solution for from a few minutes to several hours at an elevated temperature, preferably about reflux temperature or 90° C. Time is not too critical, as shown by the fact that in one operation the reaction was continued for 10 hours at 96° C. with substantially no ill effects.

A large batch of bark derivative was prepared from western hemlock bark by the following process:

The bark was ground to pass a half-mesh screen and digested for 45 minutes at 170° C. with a digestion liquor consisting of an aqueous solution of a mixture of sodium bisulfite and sodium sulfite salts. The consistency of the mixture was approximately 17%, the ratio of bisulfite to sulfite was 3 to 1 based on the $SO_2$ content of the salts, and the total $SO_2$ to dry bark ratio was 0.07 to 1.0. After digestion, the liquor which contained the bark derivative was separated from the undissolved bark residue and found to contain approximately 8% total solids. Its pH was adjusted to 8.5 with sodium hydroxide, after which it was concentrated in a vacuum dryer to form a "thick liquor" containing approximately 40% total solids. (This operation was carried out according to the process of said patent application of L. E. Van Blaricom and K. R. Gray, Serial No. 688,388.)

A portion of the "thick liquor" was spray dried and used as control samples in Examples I through IV. The remainder of the "thick liquor" was divided up into aliquots and reacted with the indicated aldehydes under the given conditions prior to spray drying. Reaction in each of these cases consisted of heating the aliquot of "thick liquor" up to reflux temperature in a reflux apparatus and then adding the aldehyde. (In Examples I, II and III reaction was continued for exactly one hour in each case.) The treated solution was then spray dried.

The effectiveness of the product of the aldehyde treatment in reducing the tendency of the foregoing bark derivatives to promote foaming or air-cutting in susceptible types of drilling muds is best illustrated by the effect they have on the mud weights of suitable drilling muds when agitated. Obviously, the weight of a given volume of a foam-cut mud will be less than that of the same volume of the same mud when it is not foam-cut. Foam is lighter than liquid. Experience, both in the field and in the laboratory, indicates that lime-treated and gyp muds are more susceptible to foam-cutting than other types, so the following examples are confined to tests on those two types of mud.

In order to eliminate as many variables as possible from the tests, a large batch of a base mud composition was made and used in the following four examples. It was prepared by mixing together 2040 grams of a native Texas clay, 400 grams of bentonite clay and 14.4 liters of distilled water, and then aging the resultant mud overnight at room temperature. Aliquots of this base mud were converted to lime-treated or gyp muds as desired, and used in the mud weight determinations.

EXAMPLE I

Four aliquots of the "thick liquor" described above were reacted in the indicated manner with 0%, 1%, 3% and 5% respectively of formaldehyde in the form of a formalin solution and spray dried to yield products illustrative of the effect of varying the amount of formaldehyde used in the invention. Each of the thusly obtained products was then tested in samples of lime-treated mud prepared from the base mud as follows:

300 mls. of base mud, 50 mls. of distilled water, 3.5 gms. of NaCl (1%), 1 gm. gypsum ($CaSO_4 \cdot 2H_2O$) and 4 gms. of the spray dried product (equivalent to 1 lb./bbl. gypsum and 4 lbs./bbl. product) were mixed at high speed for one minute. 3 gms. of caustic (equivalent to 3 lbs./bbl.) was added and the mud mixed for an additional 5 minutes at high speed. 5 gms. of lime (equivalent to 5 lbs./bbl.) were then added and the mud mixed once more at high speed for 5 minutes. The samples were now permitted to stand at room temperature for 5 minutes, after which mud weights were determined on them in the usual manner. These mud weights are the so-called "breakover" weights, and correspond to the breakover point in field practice when a fresh water mud is converted (broken-over) to a lime-treated mud. It is at this exact time that foam-cutting becomes the most critical problem when using lime-treated muds, since the lime tends to flocculate the clay therein and the mud stiffens appreciably and releases foam with greatly increased difficulty.

After determination of the "breakover" mud weights, etc., the remaining mud left of each of the four samples was placed in a roller cabinet and aged overnight at 70° C. They were then mixed for 5 minutes at high speed, permitted to stand for 5 minutes and their mud weights determined once more. These are the so-called "aged" mud weights. The mud weights obtained in this manner are shown in Table I.

Table I

| Mud Sample Including | Mud Weights | |
|---|---|---|
| | Breakover | Aged |
| No formaldehyde in Product (control) | 8.4 | 8.7 |
| 1% formaldehyde | 8.5 | 8.7 |
| 3% formaldehyde | 8.8 | 8.8 |
| 5% formaldehyde | 8.9 | 8.8 |

The usual viscosity, gel strength and fluid loss determinations were made on the foregoing samples but were not included in the table because there was practically no difference in them.

In the foregoing tests, the lime-treated muds having a mud weight of about 8.8 were practically without foam or foam-cutting. On the other hand, the two samples containing 0% and 1% formaldehyde were sufficiently foam-cut to reduce the mud weights (comparable to densities) by approximately 4.5% and 3.5% respectively. That amount of foam is sufficient to cause considerable difficulty in field practice on many occasions. Such foam not only increases the difficulties the drillers have in observing the mud for changes in conditions down the shaft, but also increases the danger of blow-outs.

EXAMPLE II

This example illustrates the use of other types of aldehyde and aldehyde yielding compounds. Six aliquots of the "thick liquor" were reacted in the same manner as in Example I with the following compounds: 3% formaldehyde, 4.5% acetaldehyde, 3% glyoxal, 10% furfural, and 3% hexamethylenetetramine, respectively, and spray dried. Each of these products was tested in the same manner and with portions of lime-treated muds prepared exactly as in Example I. The resultant mud weights are comparable to those obtained in said Example I and are shown in Table II.

Table II

| Mud Sample Including | Mud Weights | |
|---|---|---|
| | Breakover | Aged |
| No aldehyde in Product (control) | 8.3 | 8.7 |
| 3% formaldehyde | 8.7 | 8.7 |
| 4.5% acetaldehyde | 8.8 | 8.8 |
| 3% glyoxal | 8.8 | 8.8 |
| 10% furfural | 8.7 | 8.8 |
| 3% hexamethylenetetramine | 8.7 | 9.0 |

The usual viscosity, gel strength and fluid loss determinations were made on the foregoing samples but were not included in the table because there was practically no difference in them for either the treated and untreated samples.

EXAMPLE III

Four portions of the same "thick liquor" as used in Examples I and II were reacted in a similar manner with 1%, 3% and 5% respectively of formaldehyde and were spray dried to form products exactly similar to those of Example I. These products were then tested in a representative gyp mud made up as follows: 350 mls. of the base mud and 4 gms. of the spray-dried extract (equivalent to 4 lbs./bbl.) were mixed at high speed for one minute. 0.4 g. caustic (equivalent to 0.4 lb./bbl.) was added and the mud mixed at high speed for 5 minutes. 3 gms. of gypsum (equivalent to 3 lbs./bbl.) were added to the foregoing, and it was again mixed at high speed for 5 minutes. The samples were now placed in a roller cabinet and aged overnight at 70° C., after which they were mixed for 5 minutes at high speed, permitted to stand for 5 minutes and then their so-called aged mud weights were determined in the conventional manner. These are shown in Table III.

Table III

| Mud Sample Including | Aged Mud Weight |
|---|---|
| No formaldehyde in product (control) | 7.6 |
| 1% formaldehyde | 8.2 |
| 3% formaldehyde | 8.6 |
| 5% formaldehyde | 8.7 |

In the case of the so-called gyp muds, no breakover point occurs as it does in the case of the lime-treated muds. The difficulty in releasing gas builds up in this type of mud as it ages. For this reason, aged mud weight tests only were run.

It will be noted from the results that the drilling mud samples were foam-cut sufficiently to reduce the mud weights over 10%. This large an amount of foam would make the mud containing it completely unusable in a field operation.

EXAMPLE IV

The reaction of the bark derivative product and aldehyde takes place very rapidly in the present invention. This is illustrated in the following example. Seven portions of the "thick liquor" as used in the preceding examples were reacted with formaldehyde in the following ways:

(a) No formaldehyde added, just spray dried.
(b) 3% formaldehyde at room temperature only, then spray dried.
(c) 3% formaldehyde room temperature, then raised to reflux, cooled and spray dried.
(d) 3% formaldehyde at reflux, refluxed 15 minutes, cooled and spray dried.

(e) 3% formaldehyde at reflux, refluxed 30 minutes, cooled and spray dried.
(f) 3% formaldehyde at reflux, refluxed 45 minutes, cooled and spray dried.
(g) 3% formaldehyde at reflux, refluxed 60 minutes, cooled and spray dried.

The foregoing seven products were tested in lime-treated mud prepared exactly as in Examples I and II except that only 3 gms. (equivalent to 3 lbs./bbl.) of the spray-dried product were used. The mud weights at breakover are given in Table IV.

*Table IV*

| Mud sample including: | Breakover-mud weight |
|---|---|
| (a) | 8.0 |
| (b) | 8.1 |
| (c) | 8.8 |
| (d) | 8.8 |
| (e) | 8.6 |
| (f) | 8.6 |
| (g) | 8.6 |

The foregoing clearly shows that the reaction takes place quite rapidly. It further shows the need for a definite reactions or condensation.

EXAMPLE V

This example shows that various types of hemlock bark extracts other than the bisulfite-sulfite digested derivative used in the foregoing examples are also benefited by the aldehyde treatment of the present invention. In this case, only sodium sulfite was used as the salt in the digestion liquor. The extract was obtained by digesting western hemlock bark in an autoclave with a digestion liquor comprising distilled water and sufficient sodium sulfite to give a ratio of 0.09 part $SO_2$ per part of dry bark. The digestion was continued for 30 minutes at 150° C., after which the liquor was drained off and fortified with the drainings from pressing the bark residues. This solution was vacuum concentrated to about 47% solids content and spray dried as product A. (The pH was approximately 8.5 at the end of the extraction, and needed no adjustment.)

100 gms. of the product was dissolved in 500 ml. of distilled water, and formalin equivalent to 6% formaldehyde on the weight of the product was added. The solution was refluxed at 90° C. for 1 hour, then cooled and spray dried to form product B.

Products A and B were tested on a lime-treated mud prepared exactly as for Examples I and II, except that products A or B, equivalent to only 3 lbs./bbl. were added. Both breakover and aged mud weights were determined. They are shown in Table V:

*Table V*

| Mud Sample Including | Mud Weight | |
|---|---|---|
|  | Breakover | Aged |
| A | 8.3 | 8.6 |
| B | 8.9 | 8.8 |

We claim:
1. The process of forming a product of hemlock bark which comprises digesting the bark in an aqueous solution of a salt of sulfurous acid and a metal of the group consisting of sodium, potassium and ammonium, and reacting the resulting bark derivative with an aldehyde yielding compound of the group consisting of formaldehyde, acetaldehyde, glyoxal, furfural and hexamethylenetetramine, which aldehyde is equivalent to from 2% to 6% of formaldehyde based on the weight of the dry derivative at an elevated temperature.

2. In the process of claim 1 digesting the bark in an aqueous solution at a pH below 7.0 at a temperature of from 105° to 200° C. while maintaining sulfurous acid salt in the mixture and forming a product containing water-soluble sulfonate salts of hydroxy aromatic polymeric compounds, increasing the pH to about 8.5, and reacting the derivative with an aqueous solution of formaldehyde.

3. The process of forming a product of hemlock bark which comprises digesting the bark in an aqueous solution of a mixture of bisulfite and sulfite of a metal of the group consisting of sodium, potassium and ammonium at a temperature of from 105° to 200° C., said mixture consisting of at least 50% of bisulfite, maintaining sulfurous acid salt in the solution during digestion, separating from the bark residue water-soluble sulfonate salts of hydroxy aromatic polymeric compounds, and reacting the water-soluble sulfonate in aqueous solution with an aldehyde yielding compound of the group consisting of formaldehyde, acetaldehyde, glyoxal, furfural and hexamethylenetetramine, which aldehyde is equivalent to from 2% to 6% of formaldehyde based on the weight of the dry derivative.

4. In the process of claim 3 reacting the water-soluble sulfonate with from 2 to 6% of formaldehyde based on the dry weight of said sulfonate.

5. The product derived from hemlock bark by digesting the bark in an aqueous solution of a salt of sulfurous acid and an alkali metal of the group consisting of sodium, potassium and ammonium at an elevated temperature, removing from the bark residue a water-soluble derivative, and reacting an aldehyde yielding compound of the group consisting of formaldehyde, acetaldehyde, glyoxal, furfural and hexamethylenetetramine, which aldehyde is equivalent to from 2% to 6% of formaldehyde based on the weight of the dry derivative with the water-soluble derivative.

6. The product of claim 5 which is formed by digesting the bark in an acid solution of said sulfurous acid salt.

7. The product of claim 5 which is formed by digesting the bark in a solution containing a mixture of bisulfite and sulfite at least 50% of which is bisulfite and the remainder substantially all sulfite.

8. The product of claim 5 which is formed by digesting the bark at a temperature of from 105° to 200° C. for from ¼ hour to 4 hours.

9. A drilling mud composition comprising an hydratable clay, water and an agent for controlling the rheological properties of the mud comprising a bark product as defined in claim 5.

10. A drilling mud composition comprising an hydratable clay, water and an agent for controlling the rheological properties of the mud comprising a bark product as defined in claim 6.

11. A drilling mud composition comprising an hydratable clay, water and an agent for controlling the rheological properties of the mud comprising a bark product as defined in claim 7.

12. A drilling mud composition comprising an hydratable clay, water and an agent for controlling the rheological properties of the mud comprising a bark product as defined in claim 8.

References Cited in the file of this patent

UNITED STATES PATENTS

| | | |
|---|---|---|
| 2,331,281 | Wayne | Oct. 12, 1943 |
| 2,549,142 | Thompson | Apr. 17, 1951 |
| 2,579,453 | Post et al. | Dec. 25, 1951 |
| 2,674,575 | Lewis et al. | Apr. 6, 1954 |
| 2,782,241 | Gray et al. | Feb. 19, 1957 |
| 2,828,334 | De Groote | Mar. 25, 1958 |
| 2,831,022 | Van Blaricom et al. | Apr. 15, 1958 |